United States Patent [19]

Fujii et al.

[11] Patent Number: 4,895,361
[45] Date of Patent: Jan. 23, 1990

[54] FRONT GUIDE POSITION ADJUSTING DEVICE IN A SHEET-FED PRESS

[75] Inventors: Yutaka Fujii; Hideki Doumoto, both of Fuchu, Japan

[73] Assignee: Ryobi Ltd., Hiroshima, Japan

[21] Appl. No.: 232,101

[22] Filed: Aug. 15, 1988

[30] Foreign Application Priority Data

Aug. 17, 1987 [JP]  Japan ................................ 62-204846

[51] Int. Cl.$^4$ ............................................. B65H 9/04
[52] U.S. Cl. .................................... 271/253; 271/245; 271/254
[58] Field of Search ............... 271/227, 233, 234, 235, 271/236, 241, 243, 244, 245, 246, 247, 248, 249, 253, 254, 255, 171

[56] References Cited

U.S. PATENT DOCUMENTS 3,030,106  4/1962  Gericke ............................. 271/254
3,080,163  3/1963  Pasquinelli ......................... 271/254

FOREIGN PATENT DOCUMENTS 57-177737  11/1982  Japan .
61-192555   8/1986  Japan .
 0041325   2/1988  Japan ................................. 271/171

Primary Examiner—F. J. Bartuska
Assistant Examiner—Edward S. Ammeen
Attorney, Agent, or Firm—Oliff & Berridge

[57] ABSTRACT

A sheet-fed press includes a front guide device which performs a positional adjustment of a printing sheet before transferring it to a transfer drum. In order to adjust an image forming portion on the printing sheet, both ends of a front guide rod are moved independently of each other. Moving distances of the both ends of the rod are computed by a central processing unit on the basis of a paper size, etc.

4 Claims, 4 Drawing Sheets

FRONT GUIDE POSITION ADJUSTING DEVICE IN A SHEET-FED PRESS

BACKGROUND OF THE INVENTION

The present invention relates generally to a sheet-fed press, and more particularly to a front guide position adjusting device for performing a positional adjustment of a printing sheet transported from a paper supply unit before forwarding it to a printing unit.

In a sheet-fed press, a printing sheet is conveyed from a paper supply unit by means of a feeder board and is then accurately positioned in a predetermined position upon effecting a positional adjustment of the printing sheet in a paper transportation direction and a direction perpendicular thereto. The paper is then sent to a printing unit while increasing the speed of the paper equal to the peripheral speed of a transfer drum. A front guide device effects a positional adjustment of the printing sheet in the direction of transportation of the printing sheet, and a side guide device effects a positional adjustment of the paper in the direction perpendicular to the transportation direction. A swing gripper grips the paper and transfers it to the transfer drum. The front guide device further adjusts a paper feeding distance to the swing gripper, to thereby adjust an image forming position on the printing sheet.

Japanese Utility Model Laid-Open Publication No. 57-177737 and Japanese Patent Laid-Open Publication No. 61-19255 disclose such front guide position adjusting devices. According to the former, a front guide rod is supported by an eccentric bearing or spherical bearing, and according to the latter, the front guide rod is supported by an adjusting arm, so that a plurality of front guide elements mounted on the front guide rod are altogether adjustable by an equi-distance in the direction of the paper transportation.

However, the above-described prior arts are disadvantages in the following respects. One disadvantage is that when an oblique positional adjustment of the printing sheet is carried out, i.e. when only one side of the printing sheet is moved by moving only one end of the front guide rod to adjust an image forming position on a printing sheet, another end of the front guide rod is correspondingly moved. Referring to FIG. 5, the one dotted-chain line indicated by reference character a shows a front guide rod position before adjusting left side thereof b, and a line indicated by reference character d shows the front guide rod position where the leftmost side thereof b has been moved by a distance c from the state indicated by the character a. When the front guide rod position is so moved, a reference mark f on left marginal side of the printing sheet e is moved by a distance g and a reference mark h on right marginal side of the printing sheet e is correspondingly moved by a distance i.

Another disadvantage is that even if one end of the front rod is moved by a predetermined distance, an actual moving distance of the printing sheet varies depending upon difference in paper size in the widthwise direction. Referring again to FIG. 5, in the case of a printing sheet e' having a reduced size in the widthwise direction as compared with the printing sheet e, a reference mark j in the left marginal portion of the paper e' is moved by a distance k, which distance is not equal to the distance g as the paper e is moved by. Accordingly, when it is desired that only the leftmost end of the front guide rod be moved by a predetermined distance, an actual moving distance of the leftmost end of the rod is appropriately determined by a skilled operator according to his experience taking the widthwise dimension of the paper into consideration. Further, the rightmost upper side portion of the printing sheet has to be backwardly moved attendant to the forward movement of the leftmost upper side portion of the printing sheet. This adjustment has also been made by the operator from his experience. Thus, the operations are intricate and take a long time. Besides, an adjustment cannot be carried out with high accuracy. Such disadvantages also exist when a right side image on the printing sheet is adjusted, and when positions of images on left and right sides of the paper are adjusted for different dimensions.

SUMMARY OF THE INVENTION

Accordingly, it is an object of the invention to provide a front guide position adjusting device of a sheet-fed press, which can adjust an image forming position on a printing sheet by adjusting the position of the printing sheet in parallel with or in oblique to the sheet transportation direction. According to the invention, the printing sheet is accurately and quickly positioned by simply inputting to an input section a pitch between reference marks provided in right and left marginal portions of the printing sheet, and moving distances of the respective reference marks.

In order to achieve the above and other objects of the invention, there is provided a guide position adjusting device of a sheet-fed press including a guide member for effecting a positional adjustment of a printing sheet, the guide member being elongated in its axial direction, the device comprising: input means for inputting numerical data representative of an adjusting position of the printing sheet; storage means for storing the numerical data; processing means for implementing arithmetic operations upon reading the numerical data out of the storage means to provide first data corresponding to a first moving distance X of a first predetermined position of the guide member and second data corresponding to a second moving distance Y of a second predetermined position of the guide member; first driving means receiving the first data from the processing means for moving the first predetermined position of the guide member in a direction perpendicular to the axial direction of the guide member by the first moving distance X defined by the first data; and second drive means receiving the second data from the processing means for moving the second predetermined position of the guide member in a direction perpendicular to the axial direction of the guide member by the second moving distance Y defined by the second data.

DETAILED DESCRIPTION OF THE PREFERRED EMBODIMENTS

Preferred embodiments of the present invention will now be described with reference to the accompanying drawings.

Figure 1:
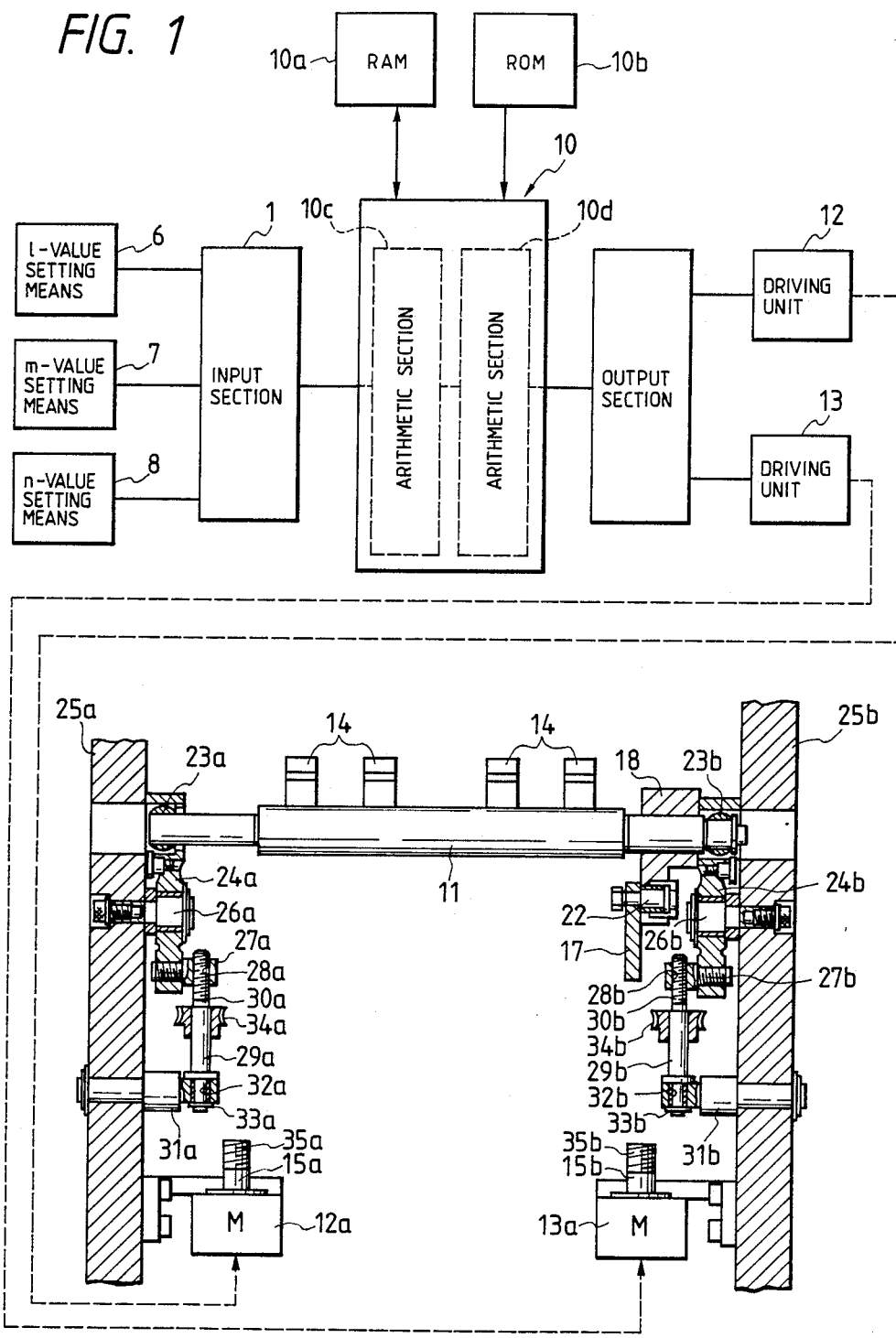
FIG. 1 is an explosion diagram showing, in part, a front guide position adjusting device of a paper-fed press according to the present invention and, in part, a block diagram showing a control section for controlling the adjusting device.
Figure 4:
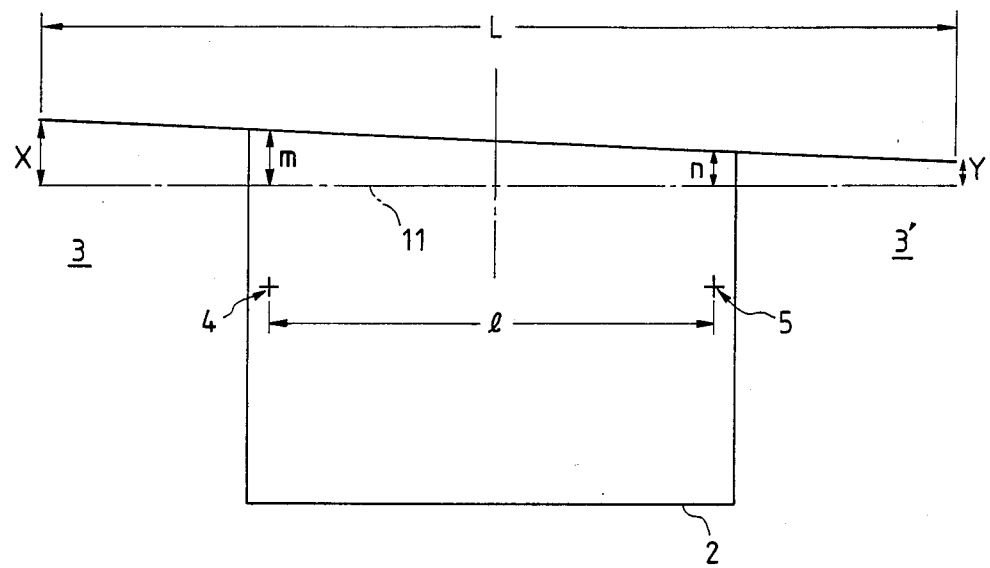
FIG. 4 is an explanatory diagram for description of the front guide device according to the invention.
Figure 5:
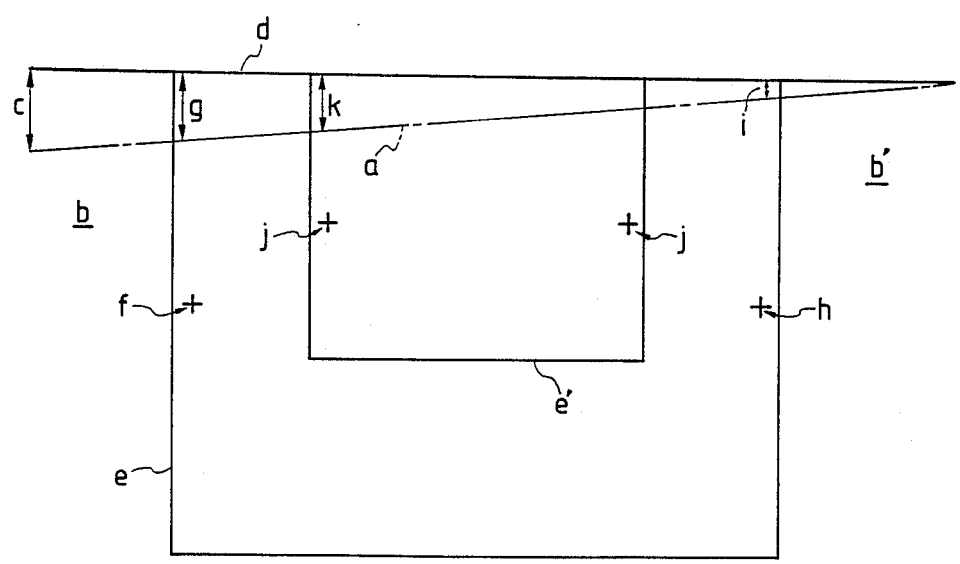
FIG. 5 is an explanatory diagram for description of a conventional front guide device.

Referring to FIG. 1, an input section 1 includes an l-value setting means 6, an m-value setting means 7, and an n-value setting means 8. The l-value setting means 6 is for setting a pitch l between the reference marks 4 and 5 respectively provided in predetermined positions on the left and right marginal portions of the printing sheet 2, as shown in FIG. 4. The m-value and n-value setting means 7 and 8 are for setting moving distances m and n of the reference marks 4 and 5, respectively, in the direction of sheet transportation.

Figure 6:
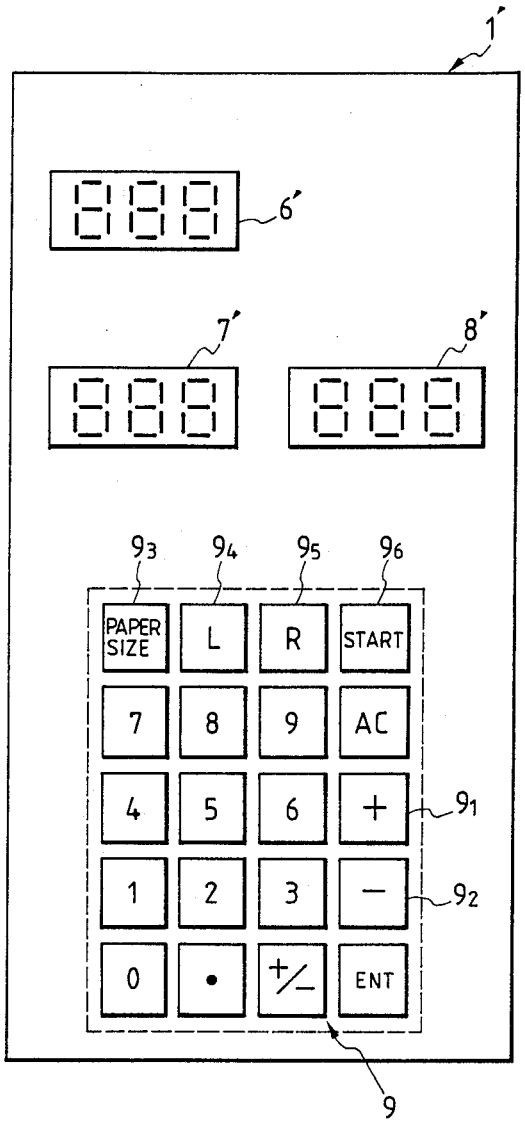
FIG. 6 is a front schematic view showing one example of an input section of the device according to the present invention.

FIG. 6 shows an operational panel 1' of the input section 1, which includes ten-key 9 for numeral input, "+" and "−" keys $9_1$ and $9_2$ for instructing incremental and decremental adjustments of the moving distance in the direction of sheet transportation, a paper size key $9_3$ for instructing to set the pitch l and the moving distances m and n, and left and right sides instructing keys $9_4$ and $9_5$ for respectively indicating the left and right sides of the printing sheet. Displays 6', 7' and 8' are for displaying the numerals l, n, m, respectively, which have been set by the setting means, 6, 7 and 8. A start key $9_6$ is for instructing a commencement of an arithmetic operation upon completion of the numeral settings. It should be noted that the numeral setting means is not limited to the illustrated ten-key 9 but any other means, such as a digital switch, may be employed.

Referring back to FIG. 1, the input section 1 is connected to a central processing unit (CPU) 10 to which a random access memory (RAM) 10a and a read-only memory (ROM) 10b are connected. The RAM 10a is for programming the numerals l, m and n. The ROM 10b is for programming a length L (see FIG. 4) of a front guide rod 11 and X and Y computing equations (to be described later). The CPU 10 includes two arithmetic sections 10c and 10d. The arithmetic section 10c computes moving distances X and Y of both ends of the front guide rod 11 and another arithmetic section 10d computes operating amounts of driving units 12 and 13 for moving both ends of the front guide rod 11. More specifically, the arithmetic unit 10c reads the numerals representative of the pitch l, the moving distances m and n out of the RAM 10a, and reads the length L of the front guide rod 11 and the equations (1) and (2) out of the ROM 10b, whereupon arithmetic operations are performed in accordance with those equations to provide the moving distances X and Y of the both ends of the front guide rod 11.

$$X = (L+l)/2l \cdot m - (L-l)/2l \cdot n \quad (1)$$

$$Y = (L+l)/2l \cdot n - (L-l)/2l \cdot m \quad (2)$$

Both ends of the front guide rod 11 are moved by the driving units 12 and 13, and the operational amounts of which are computed by the arithmetic unit 10d in accordance with the output from the arithmetic unit 10c.

Motors 12a and 13a are employed in the driving units 12 and 13, respectively, as driving sources. The motors may be an open-loop controllable step motor or a closed-loop controllable servo motor, or may be another type of motors insofar as their rotations are controllable.

The arithmetic unit 10d provides numbers of rotations of the motors 12a and 13a in accordance with the moving distances X and Y computed by the arithmetic unit 10c. More specifically, the arithmetic unit 10d receives the moving distances X and Y from the arithmetic unit 10c and reads a translation equation out of the ROM 10b, whereupon the moving distances X and Y are translated into corresponding numbers of rotations of the motors 12a and 13a. The number of rotations of the motor 12a (or 13a) is determined on the basis of a pitch of threaded portion 30a (or 30b) of an adjusting screw 29a (or 29b), a distance A between a center of a stud 26a (or 26b) pivotally supporting an adjusting arm 24a (or 24b) and a center of a pin 27a (or 27b) coupling the adjusting arm 24a (or 24b) to an adjusting screw 29a (or 29b), and a distance B between the center of the stud 26a (or 26b) and a point where a line connecting front guide elements 14 intersects with a line on the end face of the front guide rod 11.

Figure 2:
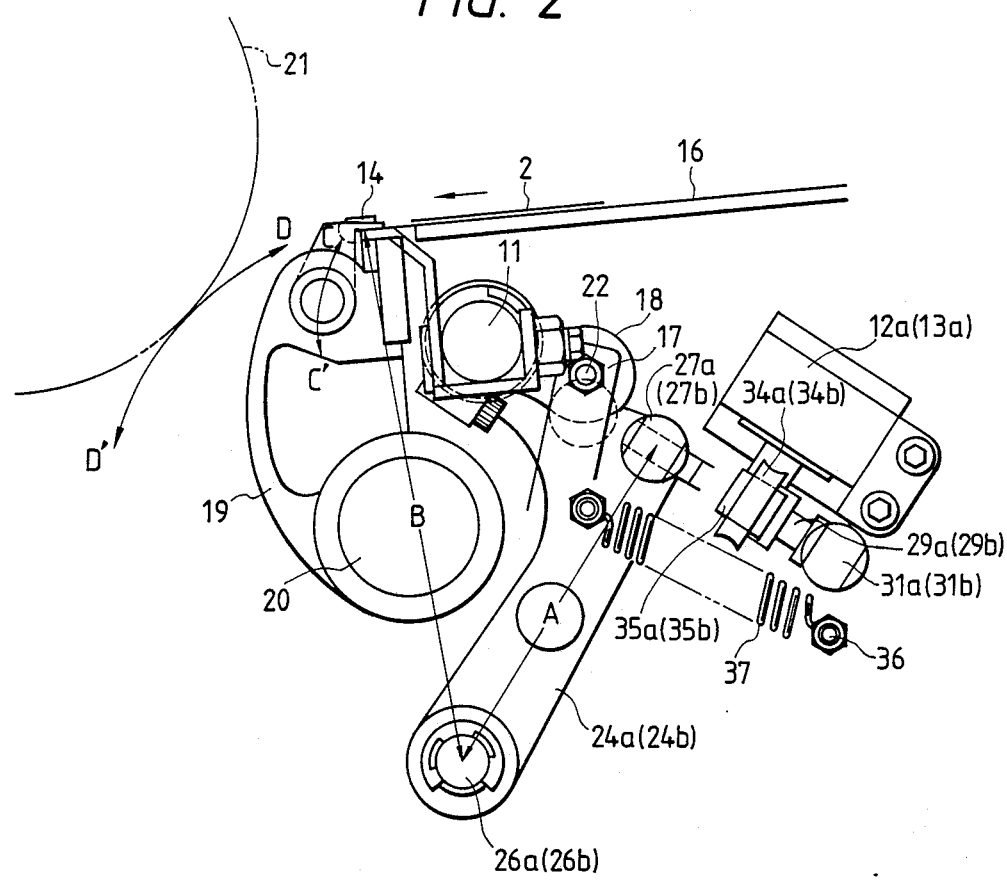
FIG. 2 is a cross-sectional side view showing one embodiment of the front guide position adjusting device according to the invention.

The front guide rod driving units 12 and 13 will be described with reference to FIGS. 1 and 2.

As shown in the figures, a plurality of front guide elements 14 are linearly mounted on the front guide rod 11. The printing sheet 2 is taken out of a sheet supply unit, and is placed on a feeder board 16 and conveyed by a belt-shaped conveyor in the direction indicated by an arrow. The front edge of the printing sheet 2 thus conveyed abuts the front guide elements 14. A link 17 is provided for upwardly and downwardly moving the front guide elements 14 by means of a front guide cam (not shown). The link 17 and a front guide arm 18 fixedly secured to the front guide rod 11 are pivotally supported on a shaft 22. The front guide elements 14 are thus swingably movable about a center of the front guide rod 11 in the direction indicated by arrows C and C'.

A swing gripper 19 is supported on a swing shaft 20 swingably in the direction indicated by arrows D and D', and grips the printing sheet 2 and transfers it to a transfer drum 21. The position of the printing sheet 2 which is gripped by the swing gripper 19 can be changed by moving the front guide elements 14 in forward or backward directin with respect to the sheet transportation direction, so that the image forming position on the printing sheet 2 can be adjusted.

Both ends of the front guide rod 11 are supported on automatic centering bearings 23a and 23b to be rotatable about its axis. The bearing 23a (or 23b) is secured to one end of adjusting arm 24a (or 24b). The adjusting arm 24a (or 24b) is pivotally supported by stud 26a (or 26b) extending from a frame 25a (or 25b) so as to be swingably movable about the center of the stud 26a (or 26b). These studs 26a and 26b are provided in positions where up and down movements of the front guide elements 14 are not bothered.

Another end of the adjusting arm 24a (or 24b) is implanted with a pin 27a (or 27b). Threaded portion 30a (or 30b) of the adjusting screw 29a (or 29b) is threadingly engaged with screw hole 28a (or 28b) formed through the pin 27a (or 27b) in the direction of its diameter.

Base portion of the adjusting screw 29a (or 29b) passes through a hole 32a (or 32b) formed in the stud 31a (or 31b) and is thereby rotatably supported about its longitudinal axis. Stop ring 33a (or 33b) is provided to prevent the adjusting screw 29a (29b) from being disengaged from the hole 32a (or 32b) when moved upwardly. To the adjusting screw 29a (or 29b), a worm wheel 34a (or 34b) is formed which meshingly engages a worm 35a (or 35b) formed on a motor shaft 15a (or 15b) of the motor 12a (or 13a). The motor 12a (or 13a) is fixed to the frame 25a (or 25b).

A tensile spring 37 is interposed under tension between two studs 36 projecting from the adjusting arm 24a (or 24b) and the frame 25a (or 25b). With the tensile spring 37, the adjusting arms 24a and 24b are urged in the directions of the studs 36, whereby the adjusting arms 24a and 24b are pulled in such directions and at the same time, backlashes of the adjusting screws 29a and 29b are prevented.

Next, movements of the front guide rod 11 will be described.

When the motor 12a (or 13a) is rotated for a given number of rotations which are computed in the arithmetic unit 10d in accordance with the moving distances X and Y, the adjusting screw 29a (or 29b) is rotated via the worm wheel 34a (or 34b) threadingly engaging the worm 35a (or 35b) formed on the motor shaft 15a (or 15b). Therefore, the pin 27a (or 27b) meshingly engaging the threaded portion 30a (or 30b) is linearly moved, whereby the adjusting arm 24a (or 24b) is swingably moved about the stud 26a (or 26b) as a fulcrum. The leftmost (or rightmost) end of the front guide rod 11 and the front guide elements 14 are thus moved forwardly or backwardly, whereby the positional adjustment of the printing sheet in the sheet transportation direction can be accomplished.

Figure 3:
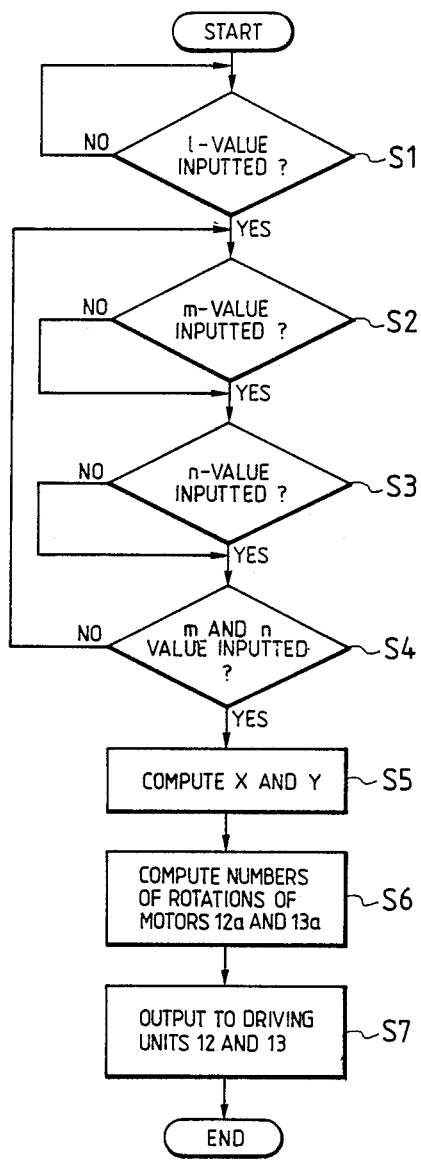
FIG. 3 is a flowchart for description of sequences executed by a central processing unit.

The sequences executed by the CPU 10 will be described with reference to a flowchart shown in FIG. 3.

In step 1, it is checked whether or not the pitch 1 is inputted. If affirmative (yes), it is checked in steps 2 and 3 whether or not the moving distances m and n are inputted. In step 4, it is checked whether or not inputs of both the moving distances m and n are completed. If affirmative (yes), the pitch 1 and the moving distances m and n are read out of the RAM 10a, and the length L and the equations (1) and (2) are read out of the RAM 10b, whereupon the moving distances X and Y are computed in step 5. In step 6, upon reading the translation equations out of the ROM 10b, the numbers of rotations of the motors 12a and 13a are computed. In step 7, the resultant values are outputted to the driving units 12 and 13 through the output circuit.

In the case of providing the start button 9₆ as shown in FIG. 6, another checking step may be interposed between the steps 4 and 5 to check whether the start button 9₆ is depressed. In this case, the step 4 is modified to execute whether the m-value or n-value is inputted. If either one of the moving distances m and n is zero, input thereof can be omitted.

In the illustrated embodiment, although the motors 12a and 13a are used as the driving sources of the driver units 12 and 13, cylinders or other equivalent means may be employed in lieu thereof. In addition, means for operating the front guide rod 11 is not limited to that shown in the figures, but an operating amount control means as disclosed in Japanese Utility Model Laid-Open Publication No. 57-117737 or rotational amount control means of an adjusting cam can also be employed.

As described, according to the present invention, the positional adjustment of the printing sheet can readily and quickly be accomplished. It is no longer necessary for the operator to move the position of the front guide rod according to his experience.

What is claimed is:

1. A guide position adjusting device of a sheet-fed press including a guide member for effecting a positional adjustment of a printing sheet, said guide member being a front guide member elongated in its axial direction, for adjusting a portion of said printing sheet in a direction of transportation of said printing sheet, said device comprising:

input means for inputting numerical data representative of an adjusting position of said printing sheet;

storage means for storing said numerical data;

processing means for implementing arithmetic operations upon reading said numerical data out of said storage means to provide first data corresponding to a first moving distance X of a first predetermined position of said guide member and second data corresponding to a second moving distance Y of a second predetermined position of said guide member;

first driving means receiving said first data from said processing means for moving said first predetermined position of said guide member in a direction perpendicular to said axial direction of said guide member by said first moving distance X defined by said first data; and second drive means receiving said second data from said processing means for moving said second predetermined position of said guide member in a direction perpendicular to said axial direction of said guide member by said second moving distance Y defined by said second data wherein said first and said second predetermined positions of said front guide member are moved independently of each other substantially parallel to said sheet transportation direction;

wherein said numerical data input by said input means are l representative of a pitch between a first reference position and a second reference position both on said printing sheet, m representative of a first sheet-moving distance by which said first reference position is moved when the positional adjustment of said printing sheet is effected, and n representative of a second sheet-moving distance by which said second reference position is moved when the positional adjustment of said printing sheet is effected, wherein a line connecting said first and second reference positions is parallel with a widthwise direction perpendicular to said sheet transportation direction, and wherein said processing means computes said first and said second moving distance X and Y in accordance with the following equations:

$$X = (L+l)/2l \cdot m - (L-l)/2l \cdot n \quad (1)$$

$$Y = (L+l)/2l \cdot n - (L-l)/2l \cdot m \quad (2)$$

where L is a length between said first and said second predetermined positions of said front guide member.

2. The device as set forth in claim 1, wherein said storage means comprises a first storage means for storing said equations (1) and (2) and the length L.

3. The device as set forth in claim 2, wherein said storage means further comprises a second storage means for storing said numeral data of l, m and n.

4. The device as set forth in claim 3, wherein said first driving means comprises a first motor and a first link means operably coupled to said first motor, said first link means further coupled to said first predetermined position of said front guide member to move said first predetermined position thereof by said first moving distance X, said first motor being rotated by a number of rotations corresponding to said first moving distance X, and wherein said second driving means comprises a second motor and a second link means operably coupled to said second motor, said second link means further coupled to said second predetermined position of said front guide member to move said second predetermined position thereof by said second moving distance Y, said second motor being rotated by a number of rotations corresponding to said second moving distance Y.

* * * * *